United States Patent [19]

Hamprecht

[11] Patent Number: 5,194,598
[45] Date of Patent: Mar. 16, 1993

[54] AZO DYESTUFFS IN WHICH THE COUPLING COMPONENT CONTAINS AN N,N-BIS(ALKOXY CARBONYLALKYL) SUBSTITUENT

[75] Inventor: Rainer Hamprecht, Odenthal-Blecher, Fed. Rep. of Germany

[73] Assignee: Bayer Aktiengesellschaft, Leverkusen, Fed. Rep. of Germany

[21] Appl. No.: 657,617

[22] Filed: Feb. 20, 1991

Related U.S. Application Data

[63] Continuation of Ser. No. 256,826, Oct. 12, 1988, abandoned.

[30] Foreign Application Priority Data

Oct. 24, 1987 [DE] Fed. Rep. of Germany ....... 3736088

[51] Int. Cl.$^5$ .................... C09B 29/085; D06P 1/18
[52] U.S. Cl. .................... 534/852; 534/582; 534/597; 534/851
[58] Field of Search ................ 534/851, 852

[56] References Cited

U.S. PATENT DOCUMENTS

| | | | |
|---|---|---|---|
| 3,962,209 | 6/1976 | Gotteschlich et al. | 534/852 X |
| 3,968,099 | 7/1976 | Leverenz | 534/852 X |
| 4,105,655 | 8/1978 | Gottschlich et al. | 534/852 |
| 4,259,237 | 3/1981 | Hamprecht | 534/851 |

FOREIGN PATENT DOCUMENTS

| | | | |
|---|---|---|---|
| 2759103 | 7/1979 | Fed. Rep. of Germany | 534/851 |
| 2916137 | 10/1980 | Fed. Rep. of Germany | 534/852 |
| 3003012 | 7/1981 | Fed. Rep. of Germany | 534/851 |
| 2300784 | 9/1976 | France | 534/852 |
| 2305470 | 10/1976 | France | 534/852 |
| 2413442 | 7/1979 | France | 534/851 |
| 58-157863 | 9/1983 | Japan | 534/851 |
| 58-210962 | 12/1983 | Japan | 534/852 |
| 1479835 | 7/1977 | United Kingdom | 534/852 |
| 1518290 | 7/1978 | United Kingdom | 534/852 |
| 2034736 | 6/1980 | United Kingdom | 534/597 |

OTHER PUBLICATIONS

ISO Recommendation R105 "Tests for Color Fastness of Textiles" (May 1959).

*Primary Examiner*—Mary C. Lee
*Assistant Examiner*—Fiona T. Powers
*Attorney, Agent, or Firm*—Sprung Horn Kramer & Woods

[57] ABSTRACT

Azo dyestuffs of the formula

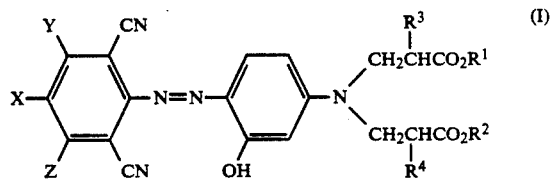

in which
X denotes H, F, Cl, Br, I, R, $CO_2R$, CN, $CF_3$ and the like,
Y/Z denotes H, $CH_3$, Cl or Br,
$R^1$, $R^2$ and R denote $C_1$-$C_4$-alkyl and
$R^3$ and $R^4$ denote H or $CH_3$, are highly suitable for the dyeing of polyester fibres, where they are distinguished by a high thermomigration fastness.

The preparation of the dyestuffs is preferably carried out by so-called "halogen/cyano exchange".

2 Claims, No Drawings

AZO DYESTUFFS IN WHICH THE COUPLING COMPONENT CONTAINS AN N,N-BIS(ALKOXY CARBONYLALKYL) SUBSTITUENT

This application is a continuation of application Ser. No. 256,826, filed Oct. 12, 1988, now abandoned.

The invention relates to azo dyestuffs of the formula

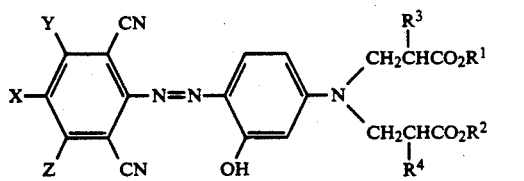
(I)

which are virtually insoluble in water and in which, independently of one another X denotes H, F, Cl, Br, I, R, CO$_2$R, COR', CN or CF$_3$,
Y denotes H, CH$_3$, Cl or Br,
Z denotes H, CH$_3$, Cl or Br,
R denotes C$_1$-C$_4$-alkyl or C$_5$-C$_6$-cycloalkyl,
R' denotes R or phenyl which is unsubstituted or substituted by C$_1$-C$_4$-alkyl or Cl,
R$^1$/R$^2$ denotes C$_1$-C$_4$-alkyl which is unsubstituted or substituted by OH or C$_1$-C$_4$-alkoxy and
R$^3$/R$^4$ denotes H or CH$_3$.

Preference is given to those dyestuffs of the formula I in which
X denotes Cl, Br or CO$_2$R,
Y denotes H or Cl,
Z denotes H or Cl,
R$^1$/R$^2$ denotes CH$_3$ or C$_2$H$_5$ and
R$^3$/R$^4$ denotes H.

Among these, preference is again given to those of the formula mentioned in which X denotes CO$_2$R and in particular Cl and above all Br.

Preparation of the dyestuffs is carried out by conventional methods.

A process is characterized in that anilines of the formula

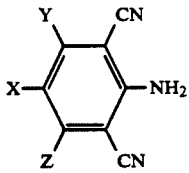

are diazotized and coupled onto coupling components of the formula

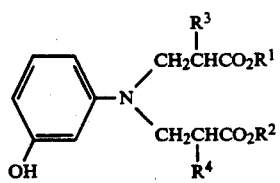

The diazotization is carried out in a conventional manner at $-20°$ to $20°$ C. by means of alkali metal nitrites, nitrosylsulphuric acid or esters of nitrous acid in mineral acids (HCl, H$_2$SO$_4$, H$_3$SO$_3$) or lower fatty acids (acetic and/or propionic acid). The coupling is also carried out by conventional methods, preferably by adding the aqueous solution or dispersion or aqueous-/alcoholic solution to the diazonium salt solution and, if necessary, by neutralizing the reaction mixture to a pH of 5-7 by the addition of alkali.

The preferred variation of the preparation is characterized in that the halogen atoms of azo compounds prepared by processes known per se of the formula

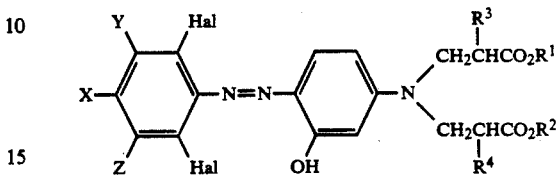

in which Hal denotes halogen, preferably Cl or Br, are exchanged for cyano groups.

This exchange reaction is also known per se and described for example in the following patent literature:
DE-A 1,544,563=GB 1,125,683
DE-A 2,456,495=GB 1,479,085
DE-A 2,759 103=GB 2,012,799
DE-A 2,846,439=GB 2,034,736
DD 217,232 (in particular the literature cited therein).

Accordingly, the o,o'-dihaloazo compound is reacted in a polar organic solvent or water with metal cyanides or cyanide ion donors at temperatures from $50°-150°$ C. until the halogen atoms are virtually completely exchanged, which can easily be monitored by means of thin-layer chromatograms.

Suitable cyanides are in particular CuCN and Zn(CN)$_2$ and also complex cyanides of the formula Me$^{\oplus}_n$(CuCN)$_{n+1}$ (Me=Na, K; n=1-3). Suitable cyanide ion-forming systems, are, for example, formaldoxime, cyanohydrins, nitroalkanes or formamide.

Preferred organic solvents are polar aprotic compounds such as, for example, DMF, DMSO, pyridine, N-methylpyrrolidone, chlorobenzene, dichlorobenzenes and the like.

The halogen/cyano exchange by means of a mixture of copper(I) cyanide and zinc cyanide is particularly suitable and preferred.

Whereas the diazo components are generally known, the coupling components are known only in part, for example JA 47-25,488 (1972).

However, these compounds are easily obtained in a manner known per se, for example by alkylating m-aminophenol.

Suitable coupling components are shown in the examples which follow.

The azo dyestuffs according to the invention are preferably suitable for dyeing synthetic textile materials in particular textile materials made of secondary cellulose acetate and cellulose triacetate, polyamide such as, for example, polyhexamethyleneadipamide and, very particularly, of aromatic polyester such as, for example, polyethylene terephthalate by the dyeing methods customary for these types of fibre, using aqueous or non-aqueous liquors.

Finally, the dyestuffs can also be applied to synthetic textile materials by transfer printing.

Furthermore, the dyestuffs are suitable for thermal transfer printing in optical recording processes.

The scarlet to ruby dyeings on polyester obtained by the novel dyestuffs are distinguished by a high tinctorial strength, bright shade, and, in particular, by a very high thermomigration fastness in combination with good general fastness properties.

With respect to the known dyestuffs according to DE-A 2,759,103, which are the nearest comparison, the novel dyestuffs have advantages in terms of affinity, tinctorial strength and thermomigration fastness.

EXAMPLE 1

Preparation of the Dyestuff of the Formula

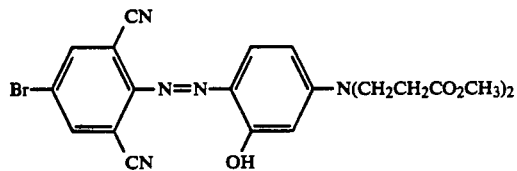

14.3 g of 2,4,6-tribromoaniline are dissolved in 15 ml of propionic acid and 30 ml of glacial acetic acid and admixed at 0° C. with 7.5 ml of 42% strength nitrosylsulphuric acid over a period of 30 minutes. To complete the diazotization, the mixture is stirred for another hour at 0° C. At 0°–5° C., the diazotization solution is added to a solution of 13 g of 3-hydroxy-N,N-bis(methoxycarbonylethyl)aniline in 100 ml of glacial acetic acid and 20 ml of 10% strength aqueous amidosulphonic acid solution. The volume is made up to 800 ml with ice water, and the mixture is stirred for another 12 hours at 5° C. The product is filtered off with suction and washed acid-free with water. Yield: 25.7 g of an orange powder.

To 20.5 g of the tribromo dyestuff obtained in 30 ml of dimethylformamide are added 0.54 g of copper(I) cyanide and 3.2 g of zinc cyanide, and the mixture is stirred at 100° C. for one hour. After cooling to 60° C., 50 ml of methanol are added, the mixture is cooled to room temperature, the product is filtered off with suction and washed with dilute hydrochloric acid and water. This gives 11.1 g of the dicyanoazo dyestuff of the above formula, which dyes polyester in a bright yellowish red having a very good thermomigration fastness.

By an analogous or similar method, the dyestuffs listed in the table which follows can be obtained in good yields.

| Example No. | Formula | Shade on polyester |
| --- | --- | --- |
| 2 | Cl–(2,6-CN)C6H2–N=N–C6H3(OH)–N(CH2CH2CO2CH3)2 | yellowish red |
| 3 | Br–(2,6-CN)C6H2–N=N–C6H3(OH)–N(CH2CH2CO2C2H5)2 | yellowish red |
| 4 | Cl–(2,6-CN)C6H2–N=N–C6H3(OH)–N(CH2CH2CO2C2H5)2 | yellowish red |
| 5 | 3,4-Cl2–(2,6-CN)C6H–N=N–C6H3(OH)–N(CH2CH2CO2CH3)2 | yellowish red |
| 6 | CF3–(2,6-CN)C6H2–N=N–C6H3(OH)–N(CH2CH2CO2CH3)2 | red |

| Example No. | Formula | Shade on polyester |
|---|---|---|
| 7 | CH₃CO—[ring with CN, CN]—N=N—[ring with OH]—N(CH₂CH₂CO₂CH₃)₂ | red |
| 8 | C₆H₅—CO—[ring with CN, CN]—N=N—[ring with OH]—N(CH₂CH₂CO₂CH₃)₂ | red |
| 9 | (H₃C)₂CH—[ring]—CO—[ring with CN, CN]—N=N—[ring with OH]—N(CH₂CH₂CO₂CH₃)₂ | red |
| 10 | CH₃O—C(=O)—[ring with CN, CN]—N=N—[ring with OH]—N(CH₂CH₂CO₂CH₃)₂ | bluish red |
| 11 | Cl, Br substituted [ring with CN, CN]—N=N—[ring with OH]—N(CH₂CH₂CO₂CH₃)₂ | yellowish red |
| 12 | H₃C, Br substituted [ring with CN, CN]—N=N—[ring with OH]—N(CH₂CH₂CO₂CH₃)₂ | yellowish red |

EXAMPLE 13

Preparation of the Dyestuff of the Formula

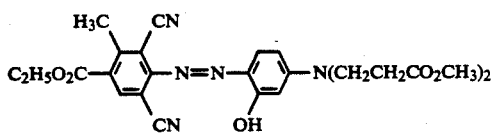

6.64 g of ethyl 2-methyl-3,5-dicyano-4-aminobenzoate (preparation according to EP 95,638) are dissolved in 20 ml of propionic acid and 40 ml of glacial acetic acid and admixed at 0° C. with 5 ml of 42% strength nitrosylsulphuric acid with stirring over a period of 30 minutes. Stirring is continued for 90 minutes at 0° C., and a solution of 8.6 g of 3-hydroxy-N,N-bis-(methoxycarbonylethyl)aniline in 50 ml of methanol are then added to the diazotization solution. The volume is made up to 600 ml with ice water. Stirring is continued for 15 hours, the product is filtered off with suction and washed neutral with water. The dyestuff obtained dyes polyester in a bluish red having good fastness properties.

We claim:

1. An azo dyestuff of the formula

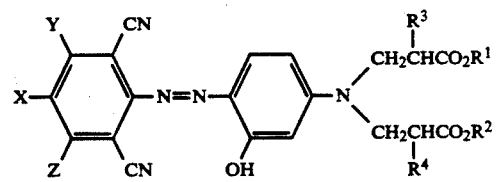

wherein
X denotes Cl, Br or CO₂R,
R denotes $C_{1-4}$-alkyl or $C_{5-6}$ cycloalkyl,
Y denotes H,
Z denotes H, $R^1/R^2$ denotes $CH_3$ or $C_2H_5$ and
$R^3/R^4$ denotes H.
2. An azo dyestuff according to claim 1 of the formula
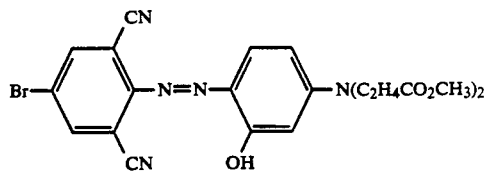
* * * * *